Figure 1A:
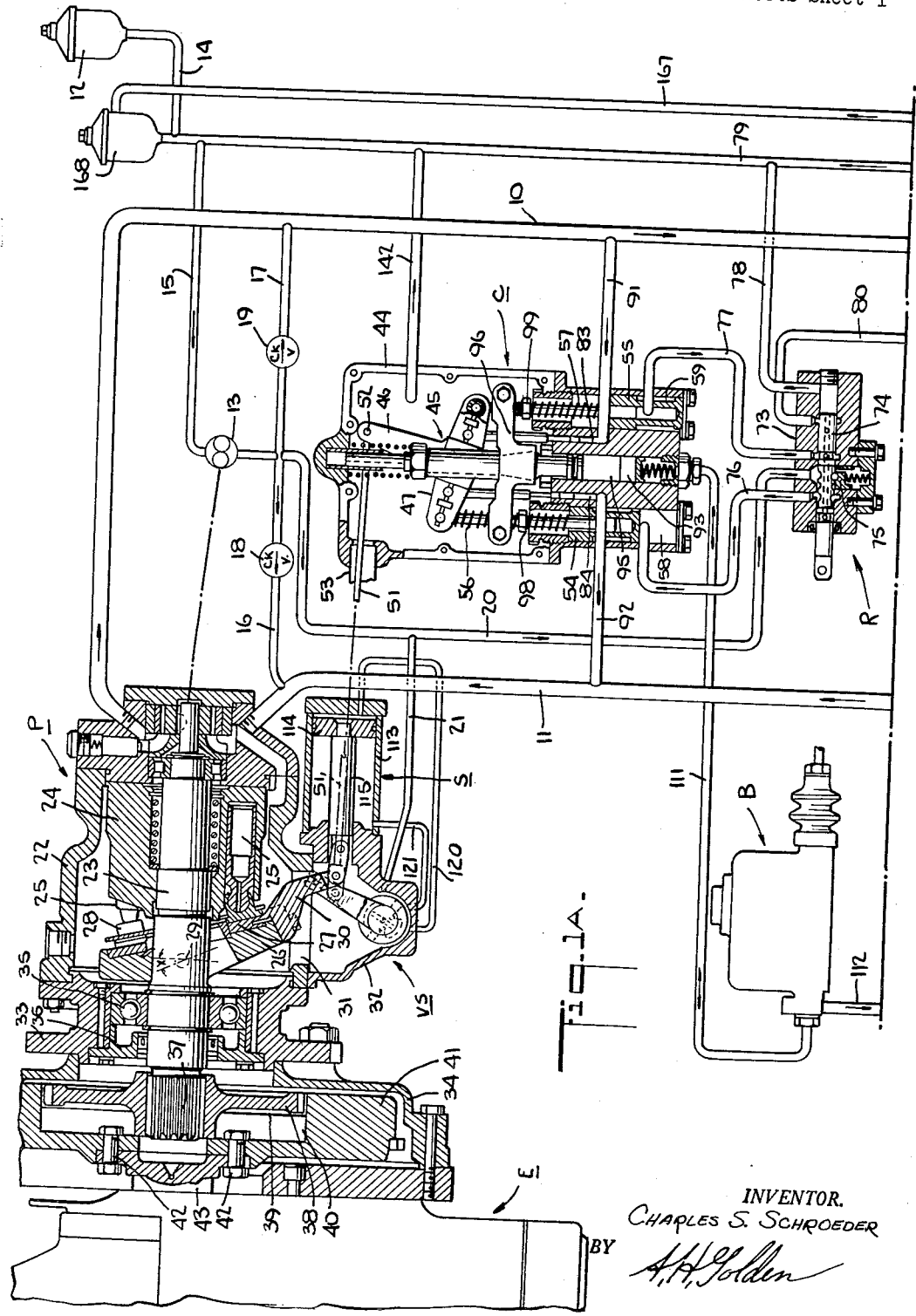
Figure 1A:
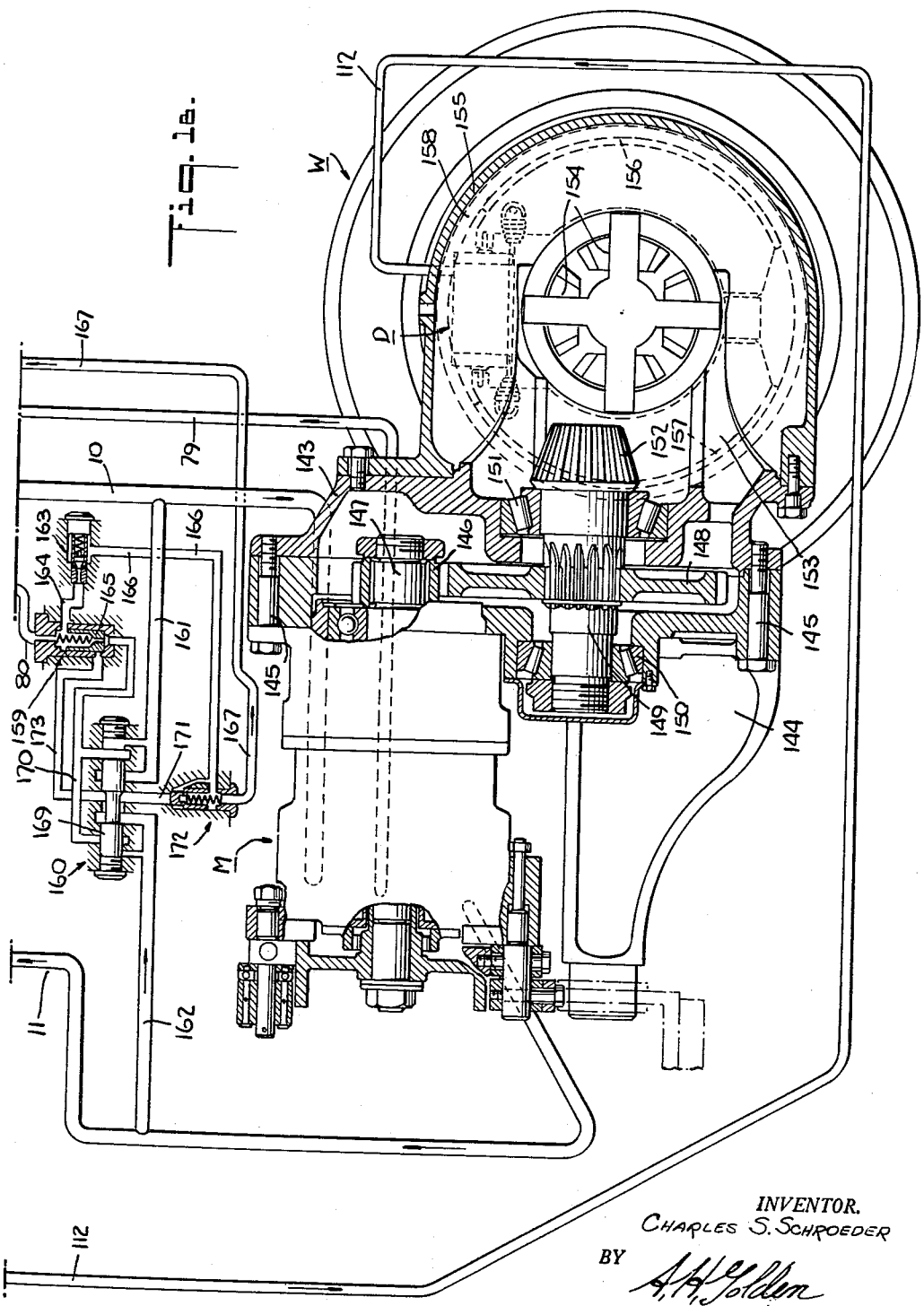

Aug. 21, 1962  C. S. SCHROEDER  3,049,884
HYDRAULIC TRANSMISSION
Filed July 13, 1960  5 Sheets-Sheet 1

INVENTOR.
CHARLES S. SCHROEDER
BY
ATTORNEY

Aug. 21, 1962  C. S. SCHROEDER  3,049,884
HYDRAULIC TRANSMISSION
Filed July 13, 1960  5 Sheets-Sheet 2

INVENTOR.
CHARLES S. SCHROEDER
BY
A. H. Golden
ATTORNEY

Aug. 21, 1962
C. S. SCHROEDER
3,049,884
HYDRAULIC TRANSMISSION
Filed July 13, 1960
5 Sheets-Sheet 3
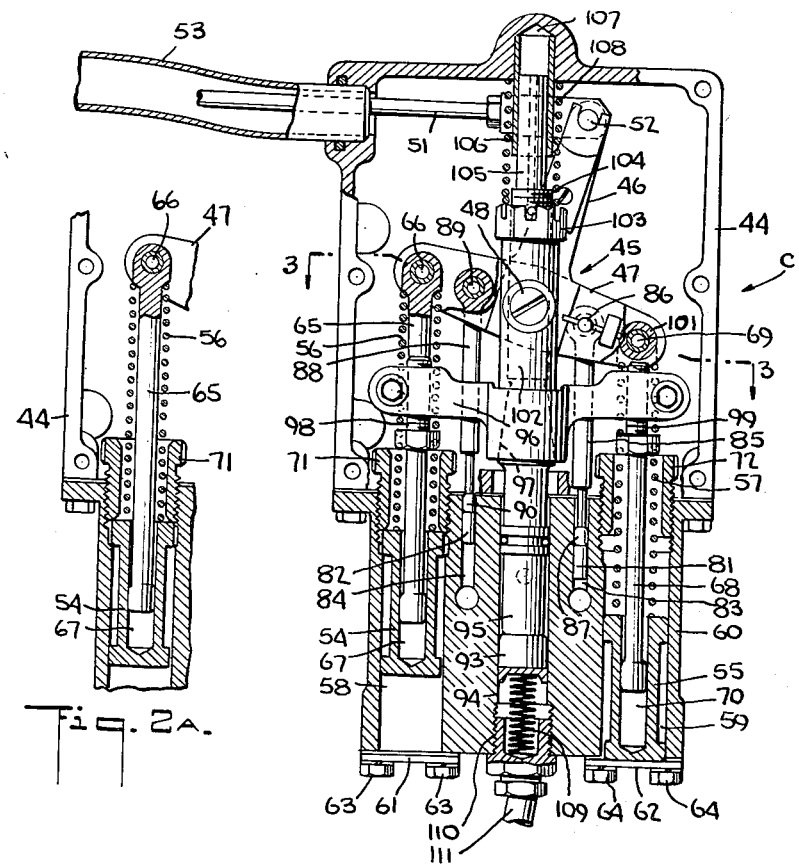
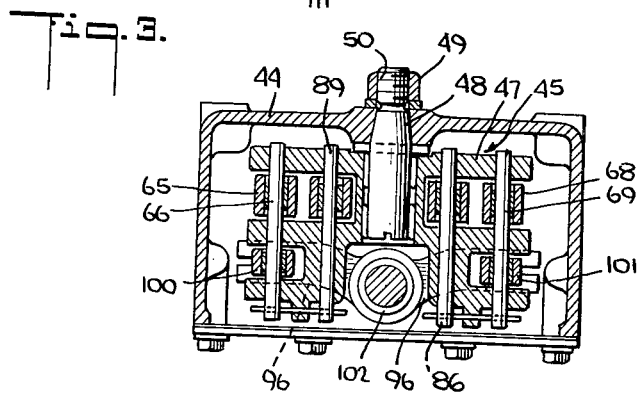
INVENTOR.
CHARLES S. SCHROEDER
BY
A. H. Golden
ATTORNEY

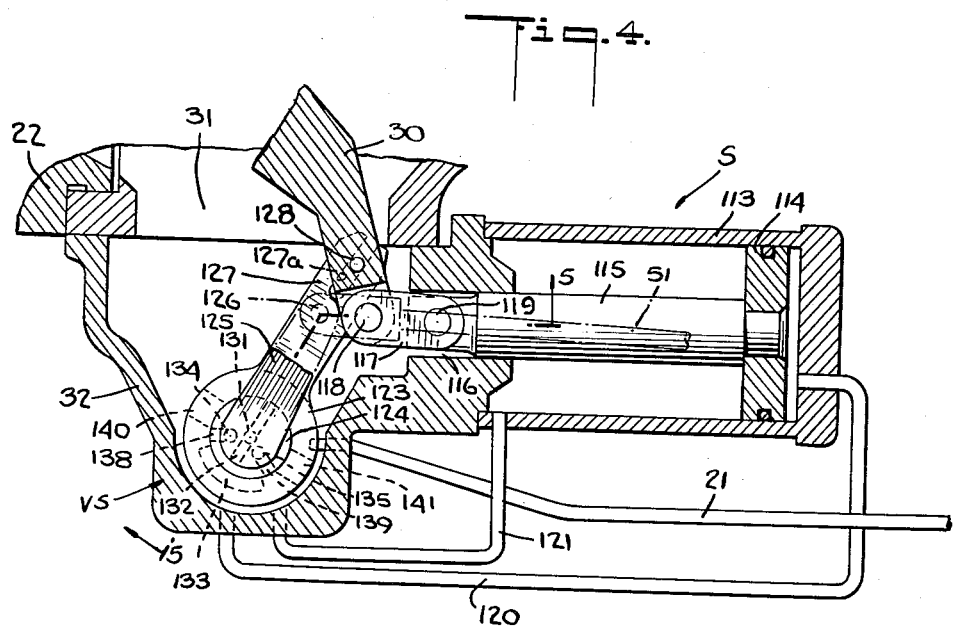
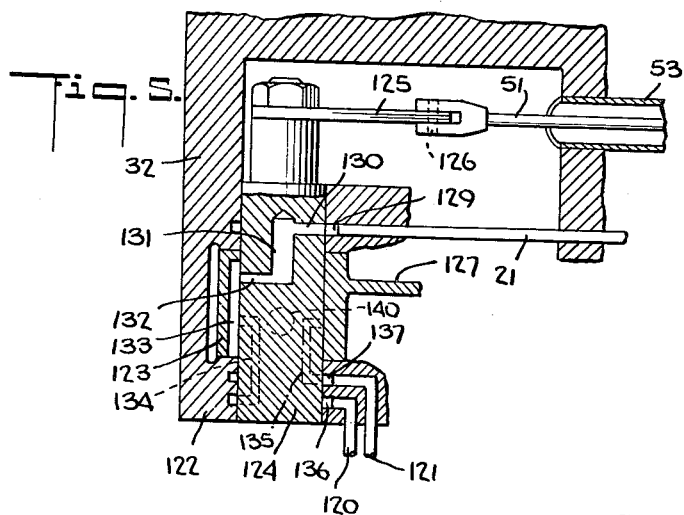

United States Patent Office 3,049,884
Patented Aug. 21, 1962

3,049,884
HYDRAULIC TRANSMISSION
Charles S. Schroeder, Villanova, Pa., assignor to The Yale & Towne Manufacturing Company, Stamford, Conn., a corporation of Connecticut
Filed July 13, 1960, Ser. No. 42,640
25 Claims. (Cl. 60—53)

This invention relates to a hydraulic transmission for a lift truck, or other vehicle. More particularly, the invention relates to a hydraulic transmission of the type incorporating a variable displacement pump and a hydraulic motor.

In such a transmission, the variable displacement pump is driven by the engine of the truck and the pump drives the hydraulic motor. The hydraulic motor drives the wheels of the truck. By varying the displacement of the pump, the torque that may be delivered by the hydraulic motor may be varied as desired from minimum to maximum in either direction of rotation, and the speed of the truck will decrease proportionately as the torque increases. The hydraulic pressure in the pressure side of the fluid circuit between the pump and the hydraulic motor of such a transmission is proportional to the load imposed on the hydraulic motor. Accordingly, any changes in the load imposed on the hydraulic motor are reflected by changes in the pressure in the circuit between the pump and the hydraulic motor.

The present invention provides a relatively simple, but extremely effective hydraulic transmission which includes automatic control means operable by changes in the fluid pressure in the pressure side of the circuit between the pump and the hydraulic motor to vary the displacement of the pump to meet any change in the load imposed on the hydraulic motor, and which, in addition, includes means which may be actuated independently of the automatic control means to decrease the displacement of the pump to thereby increase the braking effect of the engine during movement of the truck by gravity, or its own inertia, as occurs when the truck rolls down an incline.

Decreasing the displacement of the pump increases the braking effect of the engine because when the truck is moved by gravity, or its own inertia, the hydraulic motor acts as a pump to drive the variable displacement pump which in turn acts as a variable displacement hydraulic motor to drive the engine. By decreasing the displacement of the variable displacement pump while it is acting as a hydraulic motor, the speed at which the engine is driven by the variable displacement pump is increased with resulting increase in the braking effect by the engine. If the displacement of the pump while acting as a hydraulic motor is decreased to zero during movement of the truck by gravity, or its own inertia, there is an actual blockage of fluid from the hydraulic motor with resulting locking of the hydraulic motor.

During movement of the truck by gravity, or its own inertia, the automatic control means of the transmission of the invention normally increases the displacement of the pump because the pressure in the circuit between the pump and the hydraulic motor decreases. Accordingly, minimum braking is obtained from the engine when the displacement is controlled solely by the automatic control means, as the engine is driven at the slowest possible speed by the pump when the displacement of the pump while acting as a hydraulic motor is increased. However, because of the provision of the means for decreasing the displacement of the pump independently of the automatic control means, the automatic control means may be overruled by such means to decrease the displacement of the pump and thereby increase the braking effect of the engine during those instances when maximum braking is desired and when the automatic controls would otherwise increase displacement of the pump. Thus, the transmission of the invention provides automatic control to free the operator of the truck from having to manually vary the displacement of the pump to meet changes in the load imposed on the hydraulic motor, and at the same time provides for decreasing the displacement of the pump to obtain maximum braking from the engine when such is desired.

As a feature of the invention the means for independently decreasing the displacement of the pump are actuated by the same manual control as the friction brakes of the truck, such as by the brake pedal, whereby initial movement of the control will decrease the displacement of the pump to bring the truck to a standstill and further movement of the control will apply the friction brakes. By this arrangement there is little or no wear on the friction brakes with resulting increase in the service life of such brakes.

In a preferred form of the hydraulic transmission, a wobble plate type of variable displacement pump is used, and an important feature of the invention is the provision of a very simple, but effective control system for tilting the wobble plate to change the direction of flow of the pump and thereby change the direction of movement of the truck, and also for automatically varying the displacement of the pump in either direction in accordance with changes in the pressure in the circuit between the pump and the hydraulic motor. While the control system is quite simple, it provides accurate control of the tilting of the wobble plate so that the displacement of the pump closely follows changes in pressure in the circuit between the pump and the hydraulic motor so that the torque load imposed on the truck engine by the pump does not exceed the torque capacity of the truck engine and the truck engine does not therefore stall.

In the form of the invention hereafter illustrated and described, the control means for tilting the wobble plate of the pump operates through a servo-motor. While this arrangement including the servo-motor forms a feature of the invention, it will be appreciated that the control means may be used to directly tilt the wobble plate of the pump.

Figure 7:
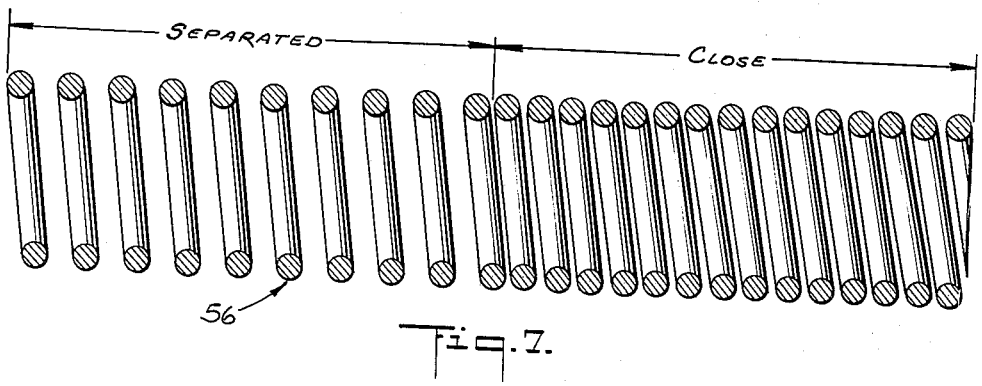
Figure 6:
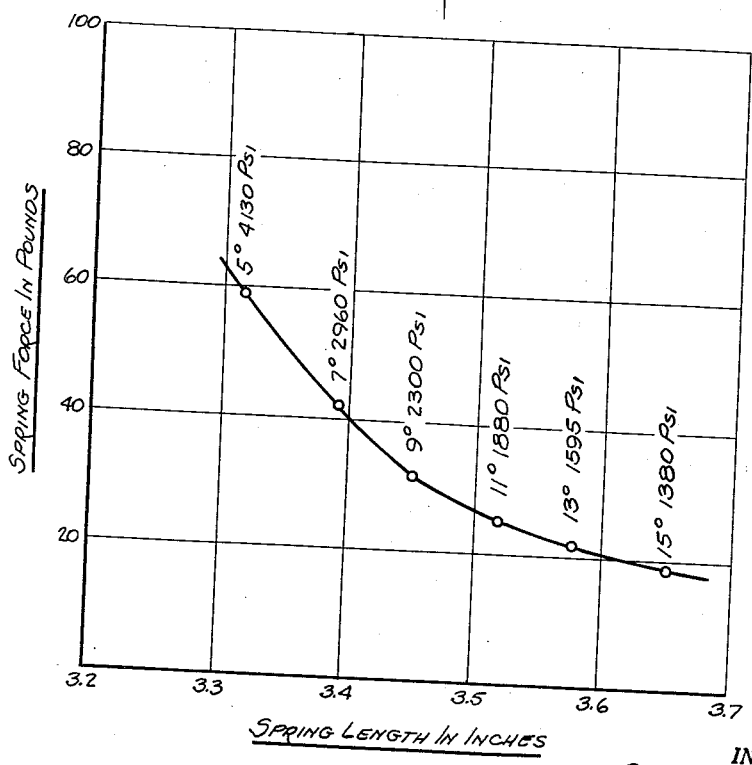

The invention and its advantages having been broadly described, a more detailed description of one embodiment of the invention is given hereafter by reference to the accompanying drawings, wherein:

FIG. 1A is a view, partly in section, of a portion of a hydraulic transmission constructed in accordance with the invention, and showing a portion of the driving engine, the variable displacement pump, the servo-motor, the master control for varying the displacement of the pump, the directional control, and the master cylinder for the brake system, FIG. 1B is a continuation of the view shown in FIG. 1A and shows the hydraulic motor, one of the ground-engaging driving wheels, the friction brakes, and a pressure relief and bypass circuit, FIG. 2 is an enlarged sectional view of the master control for varying the displacement of the pump as shown in FIG. 1A, FIG. 2A is a partial sectional view of a portion of the master control as shown in FIG. 2, but with parts removed to clearly show one of the springs used in the master control, FIG. 3 is a sectional view taken on the line 3—3 of FIG. 2, FIG. 4 is an enlarged sectional view of the servo-motor as shown in FIG. 1A, FIG. 5 is a sectional view taken on the line 5—5 of FIG. 4, FIG. 6 is a typical deflection curve from which a spring used in the master control may be designed, and FIG. 7 is an elevational view of a typical spring used in the master control.

Referring to the drawings, the general arrangement of elements of the transmission, including the necessary hydraulic circuits, is shown in FIGS. 1A and 1B. FIG. 1B is a continuation of the view shown in FIG. 1A.

Referring particularly to FIG. 1A, the internal combustion engine of the truck which serves to drive the variable displacement pump is partially shown at E, while the variable displacement pump which is connected to and driven by the engine E is shown at P.

The master control of the invention, including the automatic control means which serve to vary the displacement of the pump P in accordance with changes in the fluid pressure in the circuit between the pump and the motor, and including also the control means for decreasing the displacement of the pump independently of the automatic control means, is shown at C.

The hydraulically actuated servo-motor through which the master control C preferably operates in varying the displacement of the pump P is shown at S, while the valve for operating the servo-motor is shown at VS.

The manually operable reversing valve, which may be actuated to operate the master control C to reverse the direction of flow of fluid from the pump P is shown at R, while the master cylinder which operates both the control means for independently decreasing displacement of the pump P and the friction brakes of the truck, is shown at B.

Referring to FIG. 1B, the hydraulic motor, which is adapted to be driven by the variable displacement pump P, and which in turn drives the ground-engaging wheels of the truck, is shown at M. One of the ground-engaging wheels is shown at W, and a wheel cylinder for actuating the friction brakes for the wheel W in response to operation of the master cylinder B is shown at D.

A main hydraulic line 10 connects one side of the pump P to one side of the hydraulic motor M, while a main hydraulic line 11 connects the other side of the pump P to the other side of the motor M. Hydraulic lines 10 and 11, therefore, form a circuit between the pump P and the hydraulic motor M so that the hydraulic motor M is driven by fluid under pressure from the pump P. It will be appreciated that any change in the load imposed on the hydraulic motor M will be reflected in a change in pressure in either line 10 or line 11, depending on which is the high pressure line and which is the return line at the particular time. As will be described in detail hereafter, this change in pressure is used to actuate the automatic control means of the master control C to change the displacement of the pump P to meet this change in pressure.

Make-up fluid to take care of any leakage is supplied to the lines 10 and 11 from a reservoir 12 by means of an auxiliary pump 13 which draws the fluid from the reservoir 12 through hydraulic lines 14 and 15, and supplies the fluid to the lines 10 and 11 through lines 16 and 17. Lines 16 and 17 contain check valves 18 and 19 for preventing reverse flow from the lines 10 and 11. The auxiliary pump 13 also supplies fluid under pressure through a hydraulic line 20 to the reversing valve R, and supplies fluid under pressure through hydraulic line 20 and a hydraulic line 21 to valve VS of the servo-motor S for operating the servo-motor S.

*Variable Displacement Pump*

The variable displacement pump P shown in FIG. 1A is a conventional wobble plate type of pump of well-known construction and includes a housing 22, a shaft 23 mounted for rotation in said housing, a cylinder block or rotor 24 which is secured to and rotates with the shaft 23, a plurality of circumferential spaced pistons 25 which are mounted for reciprocating movement in suitable bores in the rotor 24, and a wobble plate 26 having an annular bearing plate 27. The pistons 25 have bearing pads 28 mounted for universal movement on the ends thereof which engage and slide on the bearing plate 27 to effect reciprocating movement of the pistons 25 as the rotor 24 is rotated relatively to the wobble plate 26.

The wobble plate is mounted for pivotal movement about a fixed pivot 29 and, as is well-known, the displacement of the pump P, and therefore the pressure that can be developed by the pump P at a given engine torque, may be varied by varying the angle the wobble plate 26 makes with a line perpendicular to the longitudinal axis of the shaft 23. This angle, which is indicated by the dimension X in FIG. 1A, is hereafter referred to as the wobble plate angle.

It will be appreciated that when the wobble plate 26 is perpendicular to the axis of the shaft 23 displacement of the pump P is zero. When the wobble plate 26 is in the position as shown in FIG. 1A, the pump P will pump fluid at maximum displacement in the direction of the arrows shown in FIG. 1A, so that line 10 is the pressure line and line 11 is the return line. If the wobble plate 26 is tilted the maximum amount in the opposite direction, the pump P will pump at maximum displacement in the opposite direction, so that line 11 becomes the pressure line and line 10 becomes the return line and the direction of rotation of the hydraulic motor M, and therefore the direction of movement of the truck, is reversed.

The wobble plate 26 is adapted to be tilted to change either the displacement of the pump P or the direction of flow from the pump P by means of an arm 30 which is secured to the wobble plate 26 and extends through an opening 31 in the pump housing 22.

A housing 32, which contains the valve VS and to which the servo-motor S is attached, is secured to the pump housing 22 around the opening 31, and as will be described in detail hereafter, the servo-motor S is connected to the arm 30 of the wobble plate 26 and serves to tilt the wobble plate 26 in a direction and in an amount as determined by the master control C.

The pump housing 22 is conveniently secured to and supported by a member 33. The member 33 is in turn secured to a fly wheel housing 34 of the engine E. The pump shaft 23 extends through the member 33 and is supported by a bearing 35 carried by the member 33. The member 33 also supports an oil seal 36 which prevents leakage of fluid from the pump P along the shaft 23. The shaft 23 has a splined outer end 37 to which a coupling gear 38 is keyed. Coupling gear 38 meshes with internal teeth 39 formed in a recess 40 provided in a fly wheel 41 which is secured by bolts 42 to a drive shaft 43 of the engine E. Thus, the pump P is connected to and is adapted to be driven by operation of the engine E to pump fluid through the circuit formed by the hydraulic lines 10 and 11 to drive the hydraulic motor M. The direction of flow of fluid from the pump P may be changed and the displacement of the pump P may be varied in each direction by changing the angle of tilt of the wobble plate 26. As will be described in detail hereafter, tilting of the wobble plate 26 is controlled by the master control C.

*Master Control*

The master control C, which is best shown in FIGS. 2 and 3, includes a housing 44 in which is pivotally supported a T-shaped bell crank 45 having a control arm 46 and a cross arm 47. As best shown in FIG. 3, the bell crank 45 is pivotally supported on a pivot pin 48 which is secured to one wall of the housing 44 by means of a nut 49 which is received on a threaded end 50 of the pivot pin 48.

A control rod 51 is pivotally secured at one end to the outer end of the control arm 46 of the bell crank 45 by means of a pin 52. The control rod 51 extends through a tube 53 which connects the housing 44 of the master control C with the housing 32 of the valve VS of the servo-motor S. As shown in FIG. 1A, the other end of the rod 51 is connected to the valve VS and, as will be described in more detail hereafter, as the control arm 46 of the bell crank 45 pivots about the pivot pin 48 through a particular angle, the valve VS is actuated by the rod 51 to cause the servo-motor S to tilt the wobble plate 26 through a proportionate angle. Thus, tilting of the wobble plate 26 is controlled by the pivotal movement of the control arm 46 of the bell crank 45, and the direction of the movement of the truck is determined by the direction in which the control arm 46 is pivoted from the vertical position.

The direction in which the control arm 46 is urged, and therefore the direction in which the truck moves is controlled by a pair of fluid-actuated pistons 54 and 55 which are operably connected to opposite ends of the cross arm 47 of the bell crank 45 by means of yieldable connections formed by helical compression springs 56 and 57. Spring 56, which connects the piston 54 with the left hand end of the cross arm 47 of the bell crank 45, can be best seen in the partial view of FIG. 2A. It will be appreciated that spring 57 similarly connects the piston 55 with the opposite end of the cross arm 47. Thus, when fluid pressure is applied below the piston 54 and released from the piston 55 the control arm 46 will be urged in a clockwise direction toward a position of maximum displacement, as shown in FIG. 2, and when fluid pressure is released from piston 54 and applied below the piston 55, the control arm 46 will be urged in a counter-clockwise direction toward a position of maximum displacement.

The pistons 54 and 55 are slidably mounted in bores 58 and 59 provided in a cylinder block 60 which is secured to the housing 44, and the bores 58 and 59 are conveniently closed at one end by plates 61 and 62 which are secured to the block 60 by bolts 63 and 64. The spring 56 bears at one end against the upper end of piston 54 and bears at the other end against a shoulder formed on a guide rod 65 which is pivotally secured at one end to the outer end of the cross arm 47 by means of a pin 66. The other end of the guide rod 65 is slidably received in a bore 67 provided in piston 54. The spring 57 similarly bears at one end against the upper end of the piston 55 and at the other end against a shoulder formed on a guide rod 68 which is pivotally secured at one end to the opposite end of the cross arm 47 by a pin 69. The other end of the guide rod 68 is slidably received in a bore 70 provided in the piston 55. As best shown in FIG. 3, the outer ends of the cross arm 47 are preferably forked to receive the outer ends of the guide rods 65 and 68. Movement of the pistons 54 and 55 toward the cross arm 47 is limited by annular plugs 71 and 72 which are adjustably threaded into the upper ends of the bores 58 and 59.

Movement of the pistons 54 and 55 is conveniently and easily controlled by means of the manually operable forward-reverse valve R, shown in FIG. 1A. The valve R is a conventional three-position spool valve having forward, reverse and neutral positions, and includes a housing 73 and a spool 74. The spool 74 is adapted to be held in any of the three positions by a spring pressed ball detent 75, which is adapted to be engaged in one of three notches provided in the spool 74.

In the position of the spool 74, as shown in FIG. 1A, the hydraulic line 20 from the auxiliary pump 13 is connected to a hydraulic line 76 which in turn is connected to the bore 58. At the same time, a hydraulic line 77 from the bore 59 is connected with a hydraulic line 78 which in turn is connected to a return line 79 to the reservoir 12. Thus, fluid pressure is applied to the piston 54 and released from the piston 55 so that the control arm 46 of the bell crank 45 and the wobble plate 26 are urged toward the positions as shown in FIG. 1A, whereby fluid is pumped through the line 10 in the direction of the arrows in FIG. 1A. If the spool 74 of the valve R is shifted to an extreme position to the right, the line 77 is connected to the line 20 and line 76 is connected to the line 78 so that fluid under pressure is applied to piston 55 and released from piston 54 to urge the control arm 46 and the wobble plate 26 in the opposite direction from that shown in FIG. 1A, whereby the pump P pumps fluid through line 11 so that movement of the truck is reversed. Thus, the direction of movement of the truck may be controlled by operation of the forward-reverse valve R.

In the middle or neutral position of the spool 74, both lines 76 and 77 are closed so that neither piston 54 nor piston 55 is moved. At the same time, the line 78 is connected to a line 80 which, as will be described in detail hereafter, opens a bypass circuit around the pump P so that when the truck is being pushed or towed and the hydraulic motor M acts as a pump, the fluid from the hydraulic motor M will bypass the pump P and the pump P and engine E will not resist movement of the truck so that the truck may be easily pushed or towed.

While the setting of the forward-reverse valve R in a forward or reverse position results in the control arm 46 being urged toward a position of maximum displacement in one direction or the other, the control arm 46 can still be moved back toward the vertical position of minimum displacement to vary the displacement of the pump by yielding of either spring 56 or spring 57, depending on whether piston 54 or piston 55 has been actuated.

Such movement of the control arm 46 to vary the displacement of the pump P, to meet changes in the load imposed on the hydraulic motor M, is provided automatically by a pair of pistons 81 and 82 which are slidably mounted in bores 83 and 84 provided in the cylinder block 60, and are adapted to be actuated by changes in the fluid pressure occurring in the main lines 10 and 11.

Movement of the piston 81 is transmitted to one side of the cross arm 47 to tilt the control arm 46 in a counterclockwise direction against the force of the spring 56 by a connecting rod 85. Connecting rod 85 is pivotally connected at one end to one side of the cross arm 47 by a pin 86, and has a rounded end 87 at the other end which bears on the upper end of the piston 81. Movement of the piston 82 is similarly transmitted to the other side of the cross arm 47 to tilt the control arm 46 in a clockwise direction against the force of the spring 57 by a connecting rod 88. Connecting rod 88 is pivotally connected at one end to the other side of the cross arm 47 by a pin 89, and has a rounded end 90 at the other end which bears on the upper end of the piston 82.

As best shown in FIG. 1A, the bore 83 is connected to the main line 10 by a hydraulic line 91, while the bore 84 is connected to the main line 11 by a hydraulic line 92. Piston 81 is therefore adapted to be moved by changes in the fluid pressure in the line 10, while the piston 82 is adapted to be moved by changes in fluid pressure in the line 11.

Thus, when the pressure in either line 10 or 11 increases sufficiently to cause either piston 81 or piston 82 to tilt the control rod 46 against the force of either spring 56 or 57, the displacement of the pump P will be automatically decreased so that the torque of the hydraulic motor M is increased to meet an increased load.

It will be appreciated that in order for the piston 81 to tilt the control arm 46, the pressure in line 10 must be such that when acting on the piston 81 it will produce a force sufficient to compress the spring 56, and that the spring 56 will be compressed until the force exerted thereby equals that exerted by the piston 81. Similarly, in order for the piston 82 to tilt the control arm 46, the pressure in line 11 must be such that when acting on the piston 82 it will produce a force sufficient to compress the spring 57, and the spring 57 will be compressed until the force exerted thereby equals that exerted by the piston 82. The position of the control arm 46, and the position of the wobble plate 26, therefore, depends on the magnitude of the pressure acting on either piston 81 or 82 and the amount the spring 56 or spring 57 deflects in exerting a balancing force. As will be described in detail hereafter, the deflection characteristics of the springs are such that the position of the wobble plate 26 will always be so related to the pressure in line 10 or 11 that the torque load imposed on the engine E by the pump P will not exceed the torque capacity of the engine E.

The torque load imposed on the engine E by the pump P at any given time depends on the pressure in either line 10 or 11 and the displacement of the pump P at the particular time. Thus, for a particular pump P and a particular engine E, there will be a maximum pressure for each position of the wobble plate 26, which, if exceeded when the wobble plate 26 is in the particular position will result in the torque capacity of the engine E being exceeded, with resulting stalling or overloading of the engine E. The particular maximum presures for the various positions of the wobble plate 26 may be readily calculated from the specifications of the pump P and the torque capacity of the engine E.

The control of the present invention provides close correlation between the position of the wobble plate 26 and the pressure in either line 10 or 11, depending on which is the pressure line at the time, so that the torque load imposed by the pump P on the engine E will not exceed the torque capacity of the engine E, and so that the torque load imposed by the pump P on the engine E when the pressure in either line 10 or 11 exceeds the maximum pressure for a position of maximum displacement of the wobble plate 26 will closely follow the torque capacity of the engine E. This prevents overloading and stalling of the engine E, while allowing the maximum possible speed to be obtained when the truck is heavily loaded.

To obtain this correlation the springs 56 and 57 are so formed as to have deflection characteristics such that when deflected by a given fluid pressure acting on either piston 81 or piston 82, the position of the wobble plate 26 will be such that for the given fluid pressure the torque load exerted by the pump P on the engine E will approach, but will not exceed, the torque capacity of the engine E.

It has been found that in order for the springs 56 and 57 to provide such deflection characteristics they must be of a non-linear type. While the specific deflection characteristics of the springs may vary for different transmission, incorporating different size engines and pumps, the general characteristics will be the same, and the approximate deflection characteristics for the springs of a particular transmission may be readily determined from the torque capacity of the engine E, the specifications of the pump P, and the dimensions of the control linkage through which movement of the pistons 81 or 82 and the deflection of the springs 56 and 57 is transmitted in tilting the wobble plate 26.

Thus, from the dimensions of the linkage system it can be readily determined by simple geometry how long the springs 56 and 57 should be and how much they must deflect for the wobble plate 26 to move through a particular wobble plate angle. The maximum pressures for a plurality of different wobble plates angles may be readily determined from the specifications of the pump P and the torque capacity of the engine E. Assuming a constant torque capacity, these maximum pressures will be proportional to the cotangent of the wobble plate angle, or approximately inversely proportional to the wobble plate angle as the maximum angle through which the wobble plate tilts is quite small. The forces that the springs 56 or 57 must exert when deflected an amount corresponding to the different wobble plate angles may then be calculated by dividing each of the maximum pressures for the different wobble plate angle by the area of the pistons 81 or 82, and multiplying the result by the ratio of the distance between the pin 58 and the pin 86 to the distance between pin 58 and pin 69. These forces being based on the maximum pressures will also be proportional to the cotangent of the wobble plate angle, or inversely proportional to the wobble plate angle. The forces so obtained can be plotted against the corresponding linear deflections of the spring for the corresponding wobble plate angles to obtain a deflection curve from which the actual spring may be designed. Such a curve is shown by way of example in FIG. 6. The particular curve is for a spring to be used with a pump having a maximum wobble plate angle of 15° in each direction. The degrees marked on the curve represent the wobble plate angles, while the pressure values marked on the curve represent the maximum pressures for the wobble plate angles as calculated for a particular pump and engine E. These values of course may vary for transmissions incorporating engines and pumps of different ratings.

The curve is plotted only through a wobble plate angle of 5° as the particular curve is intended to be used for designing a spring for a transmission incorporating a pressure relief valve which will open to relieve the pressure in the circuit between the pump P and the hydraulic motor M when the pressure reaches 4,000 p.s.i. As the maximum pressure corresponding to the wobble plate angle of 5° exceeds the pressure at which the relief valve opens, there is no possibility of overloading the engine E when the wobble plate angle is less than 5°, and the characteristics of the spring for wobble plate angles less than 5° are not therefore important from the standpoint of preventing overloading of the engine E.

The curve as so plotted is used as a guide for designing the actual spring. In order to facilitate the manufacture of the spring and to provide the best actual operating conditions due to variations in the actual operating characteristics of the engine and transmission from the theoretical characteristics on which the curve is based, the characteristics of the actual spring while approximating the characteristics as indicated by the curve may vary from the curve. For example, a spring wound in two sections with the convolutions in one section closer together than the convolutions in the other section, as illustrated in FIG. 7, may be easily manufactured, and can be made to have approximately the characteristics as indicated by the curve over the desired operating range by proper selection of the wire for the spring and the spacing of the convolutions.

By using non-linear springs of this type for the springs 56 and 57, any change in the load on the hydraulic motor M resulting in a change in the fluid pressure in the line 10 or line 11, when the pressure is above a minimum as determined by the force of either spring 56 or 57, will result in the displacement of the pump P being changed automatically to meet the load on the hydraulic motor M, without danger of the torque load imposed on the engine E by the pump P exceeding the torque capacity of the engine E. Thus, once the operator of the truck has determined the direction of movement of the truck by setting the forward-reverse valve R, the displacement of the pump P will be changed automatically to meet changes in the load imposed on the hydraulic motor M, without any further action by the operator. At the same time, the maximum possible speed may be obtained when the displacement of the pump P is decreased to meet a heavy load, as the torque load of the pump P is imposed on the engine E will closely follow the torque capacity of the engine E to obtain the benefit of substantially the full torque capacity of the engine.

When the truck is moving under its own inertia, so that the hydraulic motor acts as a pump, such as may occur when the truck rolls down an incline, it will be appreciated that the fluid pressure in the main line 10 or 11, depending on which is the high pressure line, will be decreased and the displacement of the pump will be increased automatically. Under such circumstances, the hydraulic motor M, when acting as a pump, will drive the engine E through the pump P at the slowest possible speed, and minimum braking by the engine E will be obtained. While this may be desirable in some instances when minimum drag by the engine is desired, it is not desirable in instances when maximum braking is desired.

This, however, poses no problem as means are provided in accordance with the present invention which may be optionally operated to overrule the automatic control means to decrease the displacement of the pump P independently of the automatic control means so that maximum braking may be obtained from the engine E when such is desired.

As best shown in FIG. 2, the mechanism for decreasing the displacement of the pump P independently of the automatic control means includes a piston 93 which is slidably mounted in a bore 94 and is adapted to move a shaft member 95 upwardly when fluid under pressure is supplied to the bore 94 below the piston 93.

A yoke member 96 is supported on a tapered portion 97 of the shaft member 95 and is movable with the shaft member 95. The yoke member 96 has bolts 98 and 99 adjustably secured to the outer ends thereof, and when fluid is applied below the piston 93 to move the shaft 95 upwardly, either bolt 98 or bolt 99 engages a roller 100 or a roller 101 carried respectively on pins 66 and 69 of the cross arm 47 to force the cross arm 47 toward a horizontal position. The control arm 46 thus is moved toward a vertical position to decrease the displacement of the pump P and increase the braking effect by the engine E by driving the engine at a faster speed.

The yoke member 96 is conveniently held on the tapered portion 97 by means of a sleeve 102 which surrounds the shaft 95 and is pressed against the yoke 96 by a nut 103 which is received on a threaded portion 104 provided on the shaft 95. The upper end of the shaft member 95 is guided by a portion 105 of reduced diameter which is slidably received in a guide sleeve 106. The guide sleeve 106 extends into and is supported in a recess 107 provided in the opposed wall of the housing 44.

The shaft member 95 and the yoke 96 are returned to inoperative position when the pressure is relieved from the piston 93 by a compression spring 108 which surrounds the guide sleeve 106 and bears at one end against the wall of the housing 44 and bears at the other end against the nut 103. A compression spring 109, interposed between a threaded bushing 110 and the piston 93, serves to hold the piston 93 against the lower end of the shaft member 95.

The piston 93 may be actuated from any suitable sources of fluid under pressure. However, as a feature of the invention the piston 93 is actuated by fluid under pressure from the master cylinder B which, as shown in FIG. 1A, is connected to the lower end of the bore 94 by a hydraulic line 111. The master cylinder B is also connected by means of a hydraulic line 112 to the wheel cylinder D so that the piston 93 and the friction brakes may be actuated by the same master cylinder.

Preferably the stroke, or movement, of the piston 93 necessary to substantially decrease the displacement of the pump P is less than that of the wheel cylinder D necessary to actuate the friction brakes so that upon initial actuation of the master cylinder B by suitable means, such as a foot pedal, the piston 93 will be actuated to decrease displacement of the pump to provide substantial braking action to bring the truck to a standstill, and upon further actuation of the master cylinder B thereafter the friction brakes will be applied. In this manner wear on the friction brakes is materially reduced.

While the shaft member 95 and the yoke 96 have been described as being actuated hydraulically, it will be appreciated that they can be actuated mechanically through a suitable linkage (not shown), if such is desired.

Servo-Motor and Servo-Motor Valve

Referring to FIG. 4, the servo-motor S which tilts the wobble plate 26 in response to movement of the control arm 46 includes a cylinder 113 and a piston 114 having a piston rod 115. The cylinder 113 is secured to the housing 32, and the piston rod 115 extends through an opening 116 provided through the wall of the housing 32.

The end of the piston rod 115 is connected to the arm 30 of the wobble plate 26 by means of a link 117 which is pivotally connected by a pin 118 to the end of the arm 30, and by a pin 119 to the end of the piston rod 115. Thus, movement of the piston 114 results in pivotal movement of the wobble plate 26 to change the displacement of the pump P.

Fluid under pressure is adapted to be admitted to and exhausted from the cylinder 113 on one side of the piston 114 through a hydraulic line 120, while fluid under pressure is adapted to be admitted to and exhausted from the cylinder 113 on the opposite side of the piston through a hydraulic line 121. The flow of fluid through the lines 120 and 121 to move the piston 115 is controlled by the servo-motor valve VS.

As best shown in FIG. 5, the valve VS includes a stationary portion 122, a rotatable sleeve portion 123, and a rotatable spool 124 which is adapted to rotate within the sleeve 123. The stationary portion 122 is formed as an integral portion of the wall of the housing 32. The spool 124 has an arm 125 secured thereto, and the end of the control rod 51 is pivotally secured by means of a pin 126 to the end of the arm 125 so that the spool 124 is rotated in response to movement of the control rod 51 by the control arm 46 of the bell crank 45. For clarity the outer end portion of the arm 125 and the control rod 51 are shown in phantom in FIG. 4.

The sleeve member 123 has an arm 127 secured thereto. The arm 127 has a slot 127a formed in the outer end thereof in which a pin 128 secured to the arm 30 operates to rotate the sleeve member 123 as the wobble plate 26 is tilted by the servo-motor S. As will be described in detail, rotation of the spool 124 by the control rod 51 serves to admit fluid to the cylinder 113 to move the piston 114, while movement of the sleeve member 123 serves to cut off the flow of fluid to the cylinder 113 when the piston 114 has moved the desired amount.

As best shown in FIG. 5, fluid under pressure from the auxiliary pump 13 for operating the servo-motor S flows through the hydraulic line 21 to an annular groove 129 provided in the stationary portion 122. From the annular groove 129 the fluid passes through a radial port 130 in the spool 124 to an axial passage 131. From the passage 131, the fluid passes through a port 132 to an arcuate groove 133 formed in the inner surface of the sleeve member 123.

The spool 124 also has axial passages 134 and 135. The passage 134 is in constant communication at one end with an annular groove 136 which is formed in the stationary member 122, and to which the line 120 is connected. The other passage 135 is in constant communication with an annular groove 137 which is also formed in the stationary portion 122, and to which the line 121 is connected. The other end of the passage 134 communicates with a radial port 138 through the surface of the spool 124, and the other end of the passage 135 communicates with a radial port 139 through the surface of the spool 124 spaced from the port 138 an angular distance greater than that of the arcuate groove 133, as best shown in FIG. 4.

In the position shown in FIGS. 4 and 5, the inner surfaces of the sleeve 123 between the arcuate groove 133 and a pair of ports 140 and 141 provided through the sleeve 123 close the ports 138 and 139 so that the fluid under pressure can be neither admitted nor exhausted from the cylinder 113 through the hydraulic lines 120 and 121. If, however, the spool 124 is rotated a few degrees in response to pivotal movement of the control arm 46 in a counter-clockwise direction, the port 138 will overlap the arcuate groove 133. This connects line 120 with line 21 to admit fluid under pressure to the cylinder 113 on the right hand side of the piston 114. At the same time the port 139 will overlap the port 141. This connects line 121 to the interior of the housing 32 so that fluid is exhausted from the cylinder 113 on the left hand side of the piston 114 to the interior of the housing 32 which is connected to the reservoir 12 by the tube 53 (FIGS. 1A and 2), the interior of the housing 44 of the master control C, a hydraulic line 142 (FIG. 1A), and the line 79. The piston 114 therefore moves to the left to tilt the wobble plate 26 in a clockwise direction. As the wobble plate 26 is tilted by the piston 114, the sleeve member 123 is rotated by the arm 127 in a counter-clockwise direction relatively to the spool 124 until the wobble plate 26 has been moved through an angle proportionate to that through which the control arm 46 has moved. At this time the ports 138 and 139 are again covered by the inner surfaces of the sleeve member 123 between the arcuate groove 133 and the ports 140 and 141 to thereby close lines 120 and 121 and stop movement of the piston 114.

If the spool is rotated in a clockwise direction in response to movement of the control arm 46, the port 139 will overlap the arcuate groove 133 to connect line 21 to line 121 to admit fluid under pressure to the cylinder 113 on the left hand side of the piston 114, and the port 138 will overlap port 140 to connect line 120 with the interior of the housing 32 to exhaust fluid from the right hand side of the piston 114, so that the piston 114 moves to the right to tilt the wobble plate 26 in a counterclockwise direction. This movement continues until the ports 138 and 139 are again covered by the inner surfaces of the sleeve 123 between the arcuate groove 133 and the ports 140 and 141. Thus, operation of the servo-motor through the control valve VS tilts the wobble plate 26 through an angle proportionate to that through which the control arm 46 is moved.

*Hydraulic Motor and Wheel Drive*

The hydraulic motor M may be of any desired type. The particular hydraulic motor illustrated in FIG. 1B is a wobble plate type of motor of essentially the same construction as the pump P, except that the wobble plate is fixed for a particular displacement and cannot be adjusted.

The hydraulic motor M is conveniently supported on a gear housing 143, forming a portion of an axle support 144, by means of bolts 145. The hydraulic motor M drives the ground-engaging wheels W through a suitable gear arrangement including a pinion 146 which is secured to the shaft 147 of the motor M and meshes with a gear 148 which is secured to a stub shaft 149. Stub shaft 149 is supported for rotation in bearings 150 and 151 and has a bevelled pinion 152 formed on the end thereof. The pinion 152 serves to drive the wheels W through a conventional differential gear arrangement including a ring gear 153 and bevelled pinions 154 which are enclosed in a differential housing 155.

The wheel cylinder D serves to force brake shoes 156 and 157 against a brake drum 158 which is secured to the wheels W in a conventional manner.

*Pressure Relief and Bypass Circuit*

In order to prevent the build-up of excessive pressure in either main line 10 or main line 11, a high pressure relief valve 159 is provided, as shown in FIG. 1B, which is adapted to be connected to either line 10 or line 11 by a conventional shuttle valve 160, depending on which is the high pressure line. The shuttle valve 160 is connected to main line 10 by means of a hydraulic line 161 and is connected to line 11 by means of hydraulic line 162.

Operation of the high pressure relief valve 159 is controlled by a pilot relief valve 163. The high pressure relief valve 159 is of the type having a passage through the piston thereof so that the fluid pressure on both sides of the piston is the same, and the valve remains closed until the fluid pressure acting on the rear side of the piston is relieved by the opening of the pilot relief valve 163. The pressure side of the pilot relief valve 163 is connected to the rear side of the piston 165 of the high pressure relief valve 159 by a hydraulic line 164 and the other side of the pilot relief valve 163 is connected to the reservoir 12 through a hydraulic line 166, line 167, a filter 168 (FIG. 1A), and line 14 so that opening of the pilot relief valve relieves the pressure on the rear side of the piston 165 of the high pressure relief valve 159.

When the main line 10 is the pressure line, the shuttle or spool 169 of the shuttle valve 160 is shifted to the left, as shown in FIG. 1B, by the pressure in main line 10 acting on the right hand end of the spool 169 through line 161, so that the line 161 is connected to a line 170 which interconnects the high pressure relief valve 159 with the shuttle valve 160. At the same time, the line 162 from the main line 11 is connected by the shuttle valve 160 to a line 171 which in turn is connected to a low pressure valve 172. The low pressure valve 172 maintains a minimum pressure in the line 11.

When the pilot relief valve 163 and the high pressure valve 159 open in response to excessive pressure in the line 10 acting through lines 161, 170 and 164, fluid under pressure passes through a line 173 and through line 171 to the low pressure valve 172. From the low pressure valve 172 the fluid passes back to the reservoir 12 through the line 167 and the filer 168 to relieve the pressure on the line 10.

When the line 11 becomes the high pressure line, the shuttle or spool 169 of the shuttle valve 160 is moved to the right by the fluid pressure in line 162 so that line 162 is connected to the high pressure relief valve 159 through line 170 and excessive pressure in line 11 may be relieved by the opening of the high pressure relief valve 159. At the same time, the line 161 from the main line 10 is connected to the low pressure valve 172 through the shuttle valve 160 and line 171.

As previously brought out, the setting of the forward-reverse valve R to neutral position opens a bypass circuit between main lines 10 and 11 so that fluid from the hydraulic motor M may bypass the pump P when the truck is pushed or towed whereby the pump P and engine E do not resist movement of the truck. The bypass circuit is formed by opening the high pressure relief valve 159 so that line 10 is connected to line 11 through line 161, one side of the suttle valve 160, line 170, the high pressure relief valve 159, the line 173, the center passage of the shuttle valve 160, and the line 162.

The setting of the forward-reverse valve R in neutral position opens the high pressure relief valve 159 to form the bypass circuit, because in this position of the valve R the rear side of the piston 165 of the high pressure relief valve 159 is connected to reservoir 12 through lines 80, 78, 79, and 14 (FIG. 1A), so that the pressure on the rear side of the piston 165 is relieved and the pressure relief valve 159 is opened by the relatively low pressure in the line 170. Thus, fluid from the hydraulic motor M may bypass the pump P when the truck is towed or pushed so that the pump P and the engine E present no resistance to pushing or towing of the truck.

*Operation*

The various elements of the transmission and their functions having been described, a brief description of the operation of the transmission as a unit will now be given.

Assuming for the purpose of explanation that the spool 74 of the forward-reverse valve R has been moved to the position as shown in FIG. 1A, and that the control arm 46 and the wobble plate 26 are in positions of maximum displacement, as shown in FIG. 1A, the pump P will pump fluid through the line 10 in the direction of the arrows to drive the hydraulic motor M at maximum speed, and the low pressure fluid from the hydraulic motor M will return through the line 11.

If the load on the hydraulic motor M is then increased, as would occur if the truck were driven up an incline, there will be a resulting increase in the fluid pressure in the main line 10 proportional to the increase in the load. This increase in pressure in the main line 10 will be transmitted through line 91 to piston 81 (FIG. 2). Movement of the piston 81 will be transmitted by the connecting rod 85 to the cross arm 47 to pivot the control arm 46 in a counter-clockwise direction toward the vertical position until the force exerted by the spring 56 equals that exerted by the piston 81. This pivotal movement of the control arm 46 will actuate the valve VS to cause the servo-motor V to move the wobble plate 26 through a proportionate angle to decrease the displacement of the pump P, and therefore increase the torque of the hydraulic motor M. The increase in torque will be accompanied by a decrease in speed of the hydraulic motor M. If the load on the hydraulic motor M is further increased, the pressure in the main line 10 will be further increased, and the control arm 46 will be moved further toward the vertical position by the piston 81 to further decrease the displacement of the pump P and increase the torque of the hydraulic motor M.

If the load on the hydraulic motor M is then decreased, there will be a decrease in the pressure in the main system line 10, and therefore a decrease in the force exerted by the piston 81 on the cross arm 47, so that the control arm 46 will be moved in a clockwise direction by the spring 56. This will increase the displacement of the pump P with a resulting increase in the speed of the hydraulic motor M. Thus, the displacement of the pump P will be automatically increased or decreased to meet any change in load imposed on the hydraulic motor M.

During movement of the truck by gravity or its own inertia, as occurs when the truck rolls down an incline, the hydraulic motor M will actually drive the pump P and the engine E, and the pressure in main line 10 will decrease. As the pressure in the main line 10 decreases, the spring 56 will force the control arm 46 in a clockwise direction so that the wobble plate 26 is moved to a position of maximum displacement, and minimum braking effect by the pump P and the engine E results. If maximum braking effect by the pump P and the engine E is desired, the master cylinder B may be actuated to cause the piston 93 to force the yoke member 96 against the cross arm 47 to move the control arm 46 in a counter-clockwise direction toward the vertical position so that the displacement of the pump P is decreased and maximum braking is obtained from the pump P and engine E through the tendency of the pump P to speed up the engine.

If the spool 74 of the forward-reverse valve R is shifted to the extreme right position, fluid under pressure from the auxiliary pump 13 will be supplied to the piston 55 and released from piston 54 to tilt the control arm 46 in the opposite direction from that shown in FIG. 1A, so that the pump P will pump fluid through the main line 11 to drive the hydraulic motor M in the opposite direction whereby the movement of the truck is reversed. The displacement of the pump P will then be automatically varied to meet changes in load imposed on the hydraulic motor M by the piston 82 and the spring 57 acting to tilt the control arm 46 in response to changes in pressure in the line 11.

From the preceding description it can be seen that there is provided a relatively simple, but extremely effective, hydraulic transmission which includes automatic control means operable by changes in the fluid pressure in the pressure side of the circuit between the pump and the hydraulic motor to vary the displacement of the pump to meet any changes in load imposed on the hydraulic motor, and which, in addition, includes means which may be actuated independently of the automatic control means to decrease the displacement of the pump to thereby increase the braking effect of the engine during movement of the truck by gravity or its own inertia, as occurs when the truck rolls down an incline. Thus, the transmission of the invention provides automatic control to free the operator of the truck from having to manually vary the displacement of the pump to meet changes in the load imposed on the hydraulic motor, and at the same time provides for decreasing the displacement of the pump to obtain maximum braking from the engine when such is desired.

The means for independently decreasing displacement of the pump may be actuated by the same control as the friction brakes of the truck whereby initial movement of the control will decrease the displacement of the pump to bring the truck to a standstill, and further movement of the control will apply the friction brakes. By this arrangement wear on the friction brakes is substantially reduced.

The invention also provides a very simple, but extremely accurate, automatic control for tilting the wobble plate of a wobble plate type pump, when a pump of this type is used, so that the displacement of the pump closely follows changes in pressure in the circuit between the pump and the hydraulic motor when the fluid pressure is above a predetermined minimum, and the torque load imposed on the engine of the truck by the pump closely follows, but does not exceed, the torque capacity of the engine. At the same time, the direction in which the wobble plate is tilted may be reversed to obtain reverse flow of fluid by operation of a simple fluid control valve.

While one form of the invention has been shown and described, it will be appreciated that this is for the purpose of illustration and that changes and modifications can be made therein without departing from the spirit and scope of the invention.

I now claim:

1. A hydraulic power transmission for use between a prime mover and a load, comprising a reversible variable displacement pump adapted to be driven by the prime mover, a hydraulic motor for moving the load, a fluid circuit connecting said pump and said hydraulic motor, an auxiliary source of fluid under pressure, fluid operable means including resilient yieldable connecting means operable by fluid under pressure from said auxiliary source to urge said pump to maximum displacement, fluid actuated means operable by an increase in the fluid pressure in said fluid circuit to decrease the displacement of said pump against the force of said resilient yieldable connecting means, and means for decreasing the displacement of said pump independently of said fluid actuated means.

2. A hydraulic power transmission for use between a prime mover and a load, comprising a reversible variable displacement pump adapted to be driven by the prime mover, a hydraulic motor for moving the load, a fluid circuit connecting said pump and said hydraulic motor, an auxiliary source of fluid under pressure, fluid operable means including resilient yielding connecting means operable by fluid under pressure from said auxiliary source to urge said pump to maximum displacement, and fluid actuated means operable by fluid pressure in said fluid circuit to decrease the displacement of said pump against the force of said resilient yielding connecting means.

3. A hydraulic power transmission for use between a prime mover and a load, comprising a reversible variable displacement pump adapted to be driven by the prime mover, a hydraulic motor for moving the load, a fluid circuit connecting said pump and said hydraulic motor, first fluid operable means including a resilient yieldable connection for urging said pump to maximum displacement in one direction, second fluid operable means including a resilient yieldable connection for urging said pump to maximum displacement in the other direction, an auxiliary source of fluid under pressure, a valve movable between two positions, said valve in one position connecting said auxiliary source of fluid under pressure to said first fluid operable means to urge said pump to maximum displacement in one direction, said control valve in the other position connecting said auxiliary source of fluid under pressure to said second fluid operable means to urge said pump to maximum displacement in the other direction, fluid actuated means operable by fluid pressure in said fluid circuit to decrease the displacement of said pump against the force of one of said resilient yieldable connecting means as the pressure in said fluid circuit increases, and means for decreasing the displacement of said pump independently of said fluid actuated means.

4. A hydraulic power transmission for use between a prime mover and a load, comprising a reversible variable displacement pump adapted to be driven by the prime mover, a hydraulic motor for moving the load, a fluid circuit connecting said pump and said hydraulic motor, first fluid operable means including a resilient yieldable connection for urging said pump to maximum displacement in one direction, second fluid operable means including a resilient yieldable connection for urging said pump to maximum displacement in the other direction, an auxiliary source of fluid under pressure, a valve movable between two positions, said valve in one position connecting said auxiliary source of fluid under pressure to said first fluid operable means to urge said pump to maximum displacement in one direction, said control valve in the other position connecting said auxiliary source of fluid under pressure to said second fluid operable means to urge said pump to maximum displacement in the other direction, and fluid actuated means operable by fluid pressure in said fluid circuit to decrease the displacement of said pump against the force of one of said resilient yieldable connecting means as the pressure in said fluid circuit increases.

5. A hydraulic power transmission for use between a prime mover and a load, comprising a wobble plate type of variable displacement pump adapted to be driven between the prime mover, a hydraulic motor for moving the load, a fluid circuit connecting said pump and said hydraulic motor, means for tilting the wobble plate of said pump towards a position of maximum displacement, a resilient yieldable connection between said wobble plate and said means whereby said wobble plate may be tilted toward a position of minimum displacement by yielding of said resilient yieldable connection, fluid actuated means operable by fluid presure in said fluid circuit to tilt said wobble plate toward a position of minimum displacement against the force of said resilient yieldable connection as the pressure in said fluid circuit increases, and means for tilting said wobble plate toward a position of minimum displacement independently of said fluid actuated means.

6. A hydraulic power transmission for use between a prime mover and a load, comprising a wobble plate type of variable displacement pump adapted to be driven by the prime mover, a hydraulic motor for moving the load, a fluid circuit connecting said pump and said hydraulic motor, an auxiliary source of fluid under pressure, fluid operable means operable by fluid under pressure from said auxiliary source to tilt the wobble plate of said pump toward a position of maximum displacement, a resilient yieldable connection between said wobble plate and said means whereby said wobble plate may be tilted toward a position of minimum displacement by yielding of said resilient yieldable connection, and fluid actuated means operable by fluid pressure in said fluid circuit to tilt said wobble plate toward a position of minimum displacement against the force of said resilient yieldable connection as the pressure in said fluid circuit increases.

7. A hydraulic power transmission for use between a prime mover and a load comprising a wobble plate type of variable displacement pump adapted to be driven by the prime mover, a hydraulic motor for moving the load, a fluid circuit connecting said pump and said hydraulic motor, an auxiliary source of fluid under pressure, first fluid operable means for tilting the wobble plate of said pump toward a position of maximum displacement in one direction, first resilient yieldable connecting means between said wobble plate and said first fluid operable means whereby said wobble plate may be tilted toward a position of minimum displacement by yielding of said first resilient yieldable connecting means, second fluid operable means for tilting the wobble plate of said pump toward a position of maximum displacement in the other direction, second resilient yieldable connecting means between said wobble plate and said second fluid operable means whereby said wobble plate may be tilted toward said position of minimum displacement by yielding of said second resilient yieldable connection, an auxiliary source of fluid under pressure, a fluid control valve movable between two positions, said control valve in one position connecting said auxiliary source of fluid under pressure to said first fluid operable means to tilt said wobble plate in said one direction, said control valve in the other position connecting said source of fluid under pressure to said second fluid operable means to tilt said wobble plate in said other direction, fluid actuated means operable by fluid pressure in said fluid circuit to tilt said wobble plate toward said position of minimum displacement against the force of either of said resilient yieldable connecting means as the pressure in said fluid circuit increases, and means for tilting said wobble plate toward a position of minimum displacement independently of said fluid actuated means.

8. A hydraulic power transmission for use between a prime mover and a load comprising a wobble plate type of variable displacement pump adapted to be driven by the prime mover, a hydraulic motor for moving the load, a fluid circuit connecting said pump and said hydraulic motor, an auxiliary source of fluid under pressure, first fluid operable means for tilting the wobble plate of said pump toward a position of maximum displacement in one direction, first resilient yieldable connecting means between said wobble plate and said first fluid operable means whereby said wobble plate may be tilted toward a position of minimum displacement by yielding of said first resilient yieldable connecting means, second fluid operable means for tilting the wobble plate of said pump toward a position of maximum displacement in the other direction, second resilient yieldable connecting means between said wobble plate and said second fluid operable means whereby said wobble plate may be tilted toward a position of minimum displacement by yielding of said second resilient yieldable connection, an auxiliary source of fluid pressure, a fluid control valve movable between two positions, said control valve in one position connecting said auxiliary source of fluid under pressure to said first fluid operable means to tilt said wobble plate in said one direction, said control valve in the other position connecting said source of fluid under pressure to said second fluid operable means to tilt said wobble plate in the other direction, and fluid actuated means operable by fluid pressure in said fluid circuit to tilt said wobble plate toward a position of minimum displacement against the force of either of said resilient yieldable connecting means as the pressure in said fluid circuit increases.

9. A hydraulic power transmission for use between a prime mover and a load, comprising a wobble plate type of variable displacement pump adapted to be driven by the prime mover, a hydraulic motor for moving the load, a fluid circuit connecting said pump and said hydraulic motor, means for tilting the wobble plate of said pump toward a position of maximum displacement in each direction, a resilient yieldable connection between said wobble plate and said means whereby said wobble plate may be tilted toward a position of minimum displacement by yielding of said resilient yieldable connection, said resilient yieldable connection providing increased resistance to tilting of said wobble plate as said wobble plate is tilted toward a position of minimum displacement, and fluid actuated means operable by fluid pressure in said fluid circuit to tilt said wobble plate toward a position of minimum displacement against the force of said resilient yieldable connection as the pressure in said fluid circuit increases, and means for tilting said wobble plate toward a position of minimum displacement independently of said fluid actuated means.

10. A hydraulic power transmission for use between a prime mover and a load, comprising a wobble plate type of variable displacement pump adapted to be driven by the prime mover, a hydraulic motor for moving the load, a fluid circuit connecting said pump and said hydraulic motor, means for tilting the wobble plate in said pump toward a position of maximum displacement in each direction, a resilient yieldable connection between said wobble plate and said means whereby said wobble plate may be tilted toward a position of minimum displacement by yielding of said resilient yieldable connection, said resilient yieldable connection providing increased resistance to tilting of said wobble plate as said wobble plate is tilted toward a position of minimum displacement, and fluid actuated means operable by fluid pressure in said fluid circuit to tilt said wobble plate toward a position of minimum displacement against the force of said resilient yieldable connection as the pressure in said fluid circuit increases.

11. A hydraulic power transmission for use between a prime mover and a load, comprising a wobble plate type of variable displacement pump adapted to be driven by the prime mover, a hydraulic motor for moving the load, a fluid circuit connecting said pump to said hydraulic motor, means for tilting the wobble plate of said pump toward a position of maximum displacement in each direction, a resilient spring connection between said wobble plate and said means whereby said wobble plate may be tilted from a position of maximum displacement toward a position of minimum displacement by deflection of said resilient spring connection, said spring being of the non-linear type requiring an increasing force to deflect said spring whereby an increasing force is required to tilt said wobble plate as said wobble plate is tilted toward a position of minimum displacement, fluid actuated means operable by fluid pressure in said fluid circuit to tilt said wobble plate toward a position of minimum displacement against the force of said resilient spring as the pressure in said fluid circuit increases, and means for tilting said wobble plate toward a position of minimum displacement independently of said fluid operable means.

12. A hydraulic power transmission for use between a prime mover and a load, comprising a wobble plate type of variable displacement pump adapted to be driven by the prime mover, a hydraulic motor for moving the load, a fluid circuit connecting said pump to said hydraulic motor, means for tilting the wobble plate of said pump toward a position of maximum displacement in each direction, a resilient spring connection between said wobble plate and said means whereby said wobble plate may be tilted from a position of maximum displacement toward a position of minimum displacement by deflection of said resilient spring connection, said spring being of the non-linear type requiring an increasing force to deflect said spring whereby an increasing force is required to tilt said wobble plate as said wobble plate is tilted toward a position of minimum displacement, and fluid actuated means operable by fluid pressure in said fluid circuit to tilt said wobble plate toward a position of minimum displacement against the force of said resilient spring as the pressure in said fluid circuit increases.

13. A hydraulic power transmission for use between a prime mover and a load, comprising a wobble plate type of variable displacement pump adapted to be driven by the prime mover, a hydraulic motor for moving the load, a fluid circuit connecting said pump and said hydraulic motor, a pivotally mounted control member, means for pivoting said control member from a center position to positions of maximum displacement in each direction, resilient yieldable connecting means between said means and said control member whereby said control member may be moved toward said center position by yielding of said resilient yieldable means, fluid actuated means operable by the fluid pressure in said fluid circuit to pivot said control member toward said center position against the force of said resilient yieldable connecting means as the fluid pressure in said circuit increases, a servo-motor interconnecting said control member and the wobble plate of said pump to tilt said wobble plate in response to pivotal movement of said control member, and means independent of said fluid actuated means for pivoting said control member toward said center position whereby said servo-motor will tilt said wobble plate toward a position of minimum displacement.

14. A hydraulic power transmission for use between a prime mover and a load, comprising a wobble plate type of variable displacement pump adapted to be driven by the prime mover, a hydraulic motor for moving the load, a fluid circuit connecting said pump and said hydraulic motor, a pivotally mounted control member, means for pivoting said control member from a center position to positions of maximum displacement in each direction, resilient yieldable connecting means between said means and said control member whereby said control member may be moved toward said center position by yielding of said resilient yieldable means, fluid actuated means operable by the fluid pressure in said fluid circuit to pivot said control member toward said center position against the force of said resilient yieldable connecting means as the fluid pressure in said circuit increases, and a servo-motor interconnecting said control member and the wobble plate of said pump to tilt said wobble plate in response to pivotal movement of said control member.

15. A hydraulic power transmission for use between a prime mover and a load, comprising a wobble plate type of variable displacement pump adapted to be driven by the prime mover, a hydraulic motor for moving the load, a fluid circuit connecting said pump and said hydraulic motor, a pivotally mounted control member, means for pivoting said control member from a center position to a position of maximum displacement in each direction, resilient yieldable connecting means between said means and said control member whereby said control member may be moved toward said center position by yielding of said resilient yieldable connecting means, fluid actuated means operable by fluid pressure in said circuit to pivot said control member toward said center position against the force of said resilient yieldable connecting means as the fluid pressure in said circuit increases, a servo-motor interconnecting said control member and the wobble plate of said pump for tilting said wobble plate in response to pivotal movement of said control member, said servo-motor including a fluid actuated piston connected to said wobble plate and a valve for controlling the flow of fluid from an auxiliary source of fluid pressure to said piston, said valve including two movable slides for controlling the flow of fluid to said piston, one of said slides being connected to and movable by said control member to admit fluid pressure to said piston to move said piston, the other of said slides being connected to and movable by said piston to cut off fluid pressure to said piston to stop movement of said piston when said piston has moved a predetermined amount, and means independent of said fluid actuated means for pivoting said control member toward said center position whereby said servo-motor will tilt said wobble plate toward a position of minimum displacement.

16. A hydraulic power transmission for use between a prime mover and a load, comprising a wobble plate type of variable displacement pump adapted to be driven by the prime mover, a hydraulic motor for moving the load, a fluid circuit connecting said pump and said hydraulic motor, a pivotally mounted control member, means for pivoting said control member from a center position to a position of maximum displacement in each direction, resilient yieldable connecting means between said means and said control member whereby said control member may be moved toward said center position by yielding of said resilient yieldable connecting means, fluid actuated means operable by fluid pressure in said circuit to pivot said control member toward said center position against the force of said resilient yieldable connecting means as the fluid pressure in said circuit increases, a servo-motor interconnecting said control member and the wobble plate of said pump for tilting said wobble plate in response to pivotal movement of said control member, said servo-motor including a fluid actuated piston connected to said wobble plate and a valve for controlling the flow of fluid from an auxiliary source of fluid pressure to said piston, said valve including two movable slides for controlling the flow of fluid to said piston, one of said slides being connected to and movable by said control member to admit fluid pressure to said piston to move said piston, the other of said slides being connected to and movable by said piston to cut off fluid pressure to said piston to stop movement of said piston when said piston has moved a predetermined amount.

17. A hydraulic power transmission for use between a prime mover and a load, comprising a wobble plate type of variable displacement pump adapted to be driven by the prime mover, a hydraulic motor for moving the load, a fluid circuit connecting said pump and said hydraulic motor, means for tilting the wobble plate of said pump toward a position of maximum displacement in each direction, a resilient yieldable connection between said wobble plate and said means whereby said wobble plate may be tilted toward a position of minimum displacement by yielding of said resilient yieldable connection, said resilient yieldable connection providing resistance to tilting of said wobble plate proportional to the co-tangent of the wobble plate angle, fluid actuated means operable by fluid pressure in said fluid circuit to tilt said wobble plate toward a position of minimum displacement against the force of said resilient yieldable connection as the pressure in said fluid circuit increases, and means for tilting said wobble plate toward a position of minimum displacement independently of said fluid actuated means.

18. A hydraulic power transmission for use between a prime mover and a load, comprising a wobble plate type of variable displacement pump adapted to be driven by the prime mover, a hydraulic motor for moving the load, a fluid circuit connecting said pump and said hydraulic motor, means for tilting the wobble plate of said pump toward a position of maximum displacement in each direction, a resilient yieldable connection between said wobble plate and said means whereby said wobble plate may be tilted toward a position of minimum displacement by yielding of said resilient yieldable connection, said resilient yieldable connection providing resistance to tilting of said wobble plate proportional to the co-tangent of the wobble plate angle, and fluid actuated means operable by fluid pressure in said fluid circuit to tilt said wobble plate toward a position of minimum displacement against the force of said resilient yieldable connection as the pressure in said fluid circuit increases.

19. A hydraulic power transmission for use between a prime mover and a load, comprising a wobble plate type of variable displacement pump adapted to be driven by the prime mover, a hydraulic motor for moving the load, a fluid circuit connecting said pump and said hydraulic motor, an auxiliary source of fluid under pressure, first fluid operable means for tilting the wobble plate of said pump toward a position of maximum displacement in one direction, first resilient yieldable connecting means between said wobble plate and said first fluid operable means whereby said wobble plate may be tilted toward a position of minimum displacement by yielding of said first resilient yieldable connecting means, second fluid operable means for tilting the wobble plate of said pump toward a position of maximum displacement in the other direction, second resilient yieldable connecting means between said wobble plate and said second fluid operable means whereby said wobble plate may be tilted toward said position of minimum displacement by yielding of said second resilient yieldable connection, an auxiliary source of fluid under pressure, a fluid control valve movable between three positions, said control valve in one position connecting said auxiliary source of fluid under pressure to said first fluid operable means to tilt said wobble plate in said one direction, said control valve in a second position said connecting said source of fluid under pressure to said second fluid operable means to tilt said wobble plate in said other direction, said control valve in a third position opening a bypass circuit between said hydraulic motor and said variable displacement pump, fluid actuated means operable by fluid pressure in said fluid circuit to tilt said wobble plate toward said position of minimum displacement against the force of either of said resilient yieldable connecting means as the pressure in said fluid circuit increases, and means for tilting said wobble plate toward a position of minimum displacement independently of said fluid actuated means.

20. A hydraulic power transmission for use between a prime mover and a load, comprising a wobble plate type of variable displacement pump adapted to be driven by the prime mover, a hydraulic motor for moving the load, a fluid circuit connecting said pump and said hydraulic motor, an auxiliary source of fluid under pressure, first fluid operable means for tilting the wobble plate of said pump toward a position of maximum displacement in one direction, first resilient yieldable connecting menas between said wobble plate and said first fluid operable means whereby said wobble plate may be tilted toward a position of minimum displacement by yielding of said first resilient yieldable connecting means, second fluid operable means for tilting the wobble plate of said pump toward a position of maximum displacement in the other direction, second resilient yieldable connecting means between said wobble plate and said second fluid operable means whereby said wobble plate may be tilted toward said position of minimum displacement by yielding of said second resilient yieldable connection, an auxiliary source of fluid under pressure, a fluid control valve movable between three positions, said control valve in one position connecting said auxiliary source of fluid under pressure to said first fluid operable means to tilt said wobble plate in said one direction, said control valve in a second position connecting said source of fluid under pressure to said second fluid operable means to tilt said wobble plate in said other direction, said control valve in a third position opening a bypass circuit between said hydraulic motor and said variable displacement pump, and fluid actuated means operable by fluid pressure in said fluid circuit to tilt said wobble plate toward said position of minimum displacement against the force of either of said resilient yieldable connecting means as the pressure in said fluid circuit increases.

21. A hydraulic power transmission for use between a prime mover and a load, comprising a reversible variable displacement pump adapted to be driven by the prime mover, a hydraulic motor for moving the load, a fluid circuit connecting the pump and motor providing a pressure passage and a return passage whereby fluid may be pumped through the pressure passage to drive the motor, manually operable control means for urging the pump to a predetermined displacement in each direction, fluid pressure operable control means operable by fluid pressure in the pressure passage of said circuit to overrule said manually operable control means and decrease the displacement of the pump when the fluid pressure in said pressure passage exceeds a predetermined value, and manually operable means for overruling both said manually operable control means and said fluid pressure operable control means to decrease the displacement of said pump whereby braking effect may be obtained through said pump without operating said manually operable control means.

22. A hydraulic power transmission for use between a prime mover and a load, comprising a reversible variable displacement pump adapted to be driven by the prime mover, a hydraulic motor for moving the load, a fluid circuit connecting the pump and hydraulic motor providing a pressure passage and a return passage whereby fluid may be pumped through the pressure passage to drive the motor, control means manually operable to limit operation of said pump to one pumping direction or the other so as to determine the direction of operation of said hydraulic motor, fluid actuated means operable by changes in the fluid pressure in the pressure passage of said fluid circuit for controlling the displacement of said pump whereby the displacement of the pump is decreased when the fluid pressure in said pressure passage exceeds a predetermined value, and manually operable means for overruling both said control means and said fluid pressure actuated means to decrease the displacement of said pump whereby a braking effect may be obtained through said pump.

23. A hydraulic power transmission for use between a prime mover and a load, comprising a reversible variable displacement pump adapted to be driven by the prime mover, a hydraulic motor for moving the load, a fluid circuit connecting the pump and hydraulic motor providing a pressure passage and a return passage whereby fluid may be pumped through the pressure passage to drive the hydraulic motor, fluid servo-motor means connected to said pump and operable by fluid pressure from an auxiliary source of pressure to vary the displacement of said pump in each pumping direction, control means manually operable to limit operation of said pump to one pumping direction or the other so as to determine the direction of operation of said hydraulic motor, fluid actuated means operable by changes in the fluid pressure in the pressure passage of said fluid circuit for controlling operation of said servo-motor means in varying the displacement of said pump whereby the displacement of said pump is decreased when the fluid pressure in said pressure passage exceeds a predetermined value, and manually operable means for overruling both said control means and said fluid pressure actuated means to cause said servo-motor means to decrease the displacement of said pump whereby a braking effect may be obtained through said pump.

24. A hydraulic power transmission for use between a prime mover and a load, comprising a reversible variable displacement pump adapted to be driven by the prime mover, a hydraulic motor for moving the load, a fluid circuit connecting the pump and hydraulic motor providing a pressure passage and a return passage whereby fluid may be pumped through the pressure passage to drive the hydraulic motor, fluid servo-motor means connected to said pump and operable by fluid pressure from an auxiliary source of pressure to vary the displacement of said pump in each pumping direction, control means manually operable to limit operation of said pump to one pumping direction or the other so as to determine the direction of operation of said hydraulic motor, a valve for controlling the flow of fluid from said auxiliary source to said servo-motor, said valve including two movable slides, one slide being connected to and movable by the servo-motor means to cut off flow of fluid to the servo-motor means, the other slide being movable by changes in fluid pressure in said pressure passage to permit flow to said servo-motor means to vary the displacement of said pump whereby the displacement of said pump is decreased when the fluid pressure in said pressure passage exceeds a predetermined value, and manually operable means for overruling both said control means and said fluid pressure actuated means to move said other slide to admit fluid to said servo-motor means to decrease the displacement of said pump whereby a braking effect may be obtained through said pump.

25. A hydraulic power transmission for use between a prime mover and a load, comprising a reversible variable displacement pump adapted to be driven by the prime mover, a hydraulic motor for moving the load, a fluid circuit connecting the pump and hydraulic motor providing a pressure passage and a return passage to drive the hydraulic motor, control means manually operable to limit operation of said pump to one pumping direction or the other so as to determine the direction of operation of said hydraulic motor, fluid actuated means operable by changes in the fluid pressure in the pressure passage of said fluid circuit for controlling the displacement of said pump whereby the displacement is decreased when the fluid pressure in said pressure passage exceeds a predetermined value, friction brake means for said load, and manually operable means for actuating said friction brake means and for overruling both said control means and said fluid pressure actuated means to decrease the displacement of said pump whereby a braking effect may be also obtained through said pump.

References Cited in the file of this patent
UNITED STATES PATENTS

| | | |
|---|---|---|
| 2,161,439 | Thoma | June 6, 1939 |
| 2,349,350 | Jandasek | May 23, 1944 |
| 2,421,013 | Cornwell | May 27, 1947 |
| 2,457,729 | Roberts et al. | Dec. 28, 1948 |
| 2,886,944 | Horwood | May 19, 1959 |
| 2,932,948 | Neff et al. | Apr. 19, 1960 |
| 2,941,365 | Carlson et al. | June 21, 1960 |